G. H. DAY.
EYEGLASSES AND SPECTACLES.
APPLICATION FILED OCT. 10, 1911.
1,036,083.
Patented Aug. 20, 1912.
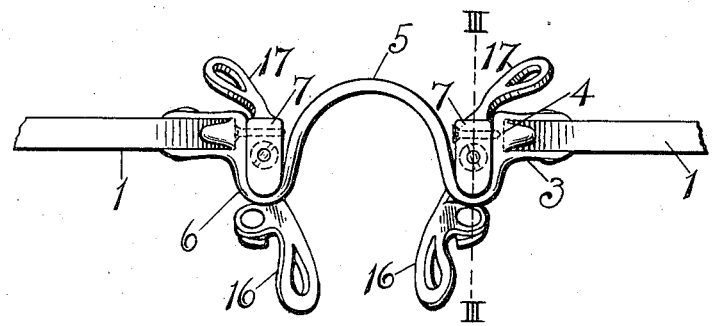
FIG. I
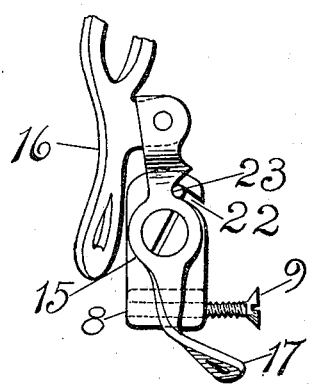
FIG. II
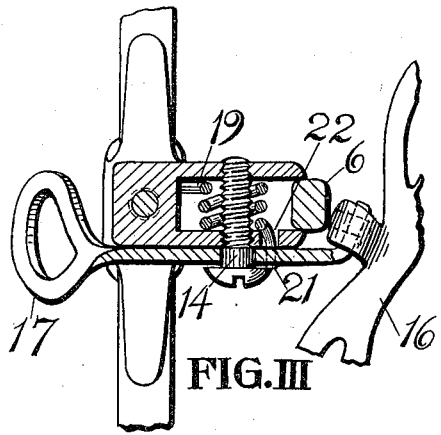
FIG. III
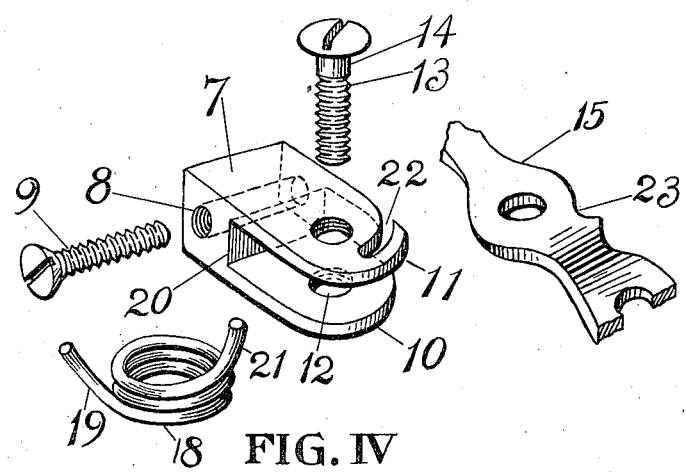
FIG. IV
WITNESSES:
Joseph J. Demers.
Reginald H. Waters.
BY
INVENTOR
GEORGE H. DAY
H. H. Styll & H. L. Parsons
ATTORNEYS

UNITED STATES PATENT OFFICE.

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A CORPORATION OF MASSACHUSETTS.

EYEGLASSES AND SPECTACLES.

1,036,083.  Specification of Letters Patent.  Patented Aug. 20, 1912.

Application filed October 10, 1911. Serial No. 653,794.

*To all whom it may concern:*

Be it known that I, GEORGE H. DAY, a citizen of the United States, residing at Southbridge, in the county of Worcester and State of Massachusetts, have invented certain new and useful Improvements in Eyeglasses and Spectacles, of which the following is a specification.

My invention relates to improvements in eyeglasses and spectacles and has for its leading object the provision of an improved form of finger piece mounting.

The further object of my invention is the provision of a novel and improved unitary structure embodying a finger piece and nose clamp and means for resiliently forcing the nose clamp into operative position, which unitary structure may be readily secured to an ordinary spectacle or other eyeglass mounting.

A further object of the invention is the provision of an improved finger piece attachment for eyeglasses in which the actuating spring shall be satisfactorily concealed, and which attachment will consequently present an extremely neat and attractive appearance.

Other objects and advantages of my improved finger piece attachment for eyeglasses will be readily apparent by reference to the following description taken in connection with the accompanying drawings, and it will be understood that I may make any modifications in the specific structure shown and described within the scope of the appended claims without departing from or exceeding the spirit of my invention.

Figure I represents a fragmentary top plan view of a pair of eyeglasses equipped with my improved attachment. Fig. II represents an enlarged plan view of the attachment detached from the glasses. Fig. III represents a vertical sectional view on the line III—III of Fig. I, and Fig. IV represents a perspective view of the various parts of my attachment in disassembled relation.

In the drawings, in which similar characters of reference are employed to denote corresponding parts throughout the several views, the numeral 1 designates the lenses of the eyeglasses having secured thereto the clips 3 and straps 4 of ordinary construction which are formed on the ends of the bridge 5 to secure the lenses to the bridge. Said bridge is formed adjacent each of the lens clips with the bends 6 into which my attachment is fitted, this bridge mounting as described being a form at present in common use and forming no part of my invention.

Fitting into the bends 6 of the bridge 5 are the housings or casings 7 of my invention, and as the various parts located at both of the bends 6 are identical I will describe but one of the same. The casing 7 has extending transversely thereof near its forward end an internally threaded passage or socket 8, while engaged in said socket 8 is a securing screw 9 which also passes through or is engaged in the lens strap 4. At the left hand of Fig. I, I have illustrated said screw 9 as fitting into a countersunk passage formed in the strap and being screwed into the casing 7, but at the right hand I have shown the screw as screwing into the strap, the function of the screw in either position being to secure the casing in place. Fitting against the bridge 5 and resting respectively against the upper and lower faces thereof are the rearwardly or inwardly extending ears 10 and 11 formed on the casing, their engagement with the bridge aiding in firmly securing the housing in position.

The ears 10 and 11 have formed therethrough the alined screw receiving orifices 12 which are threaded to engage the threaded portion 13 of the pivot screw which has the plain or unthreaded portion 14 to receive the finger piece lever 15. Said finger piece lever has suitably secured on its inner end the nose grip 16 and has its outer end formed into the handle loop 17 fitting over the outer clip 3.

To actuate the finger piece lever and resiliently force the nose grip into operative position, I mount on the pivot post or secure intermediate the ears 10 and 11 the helical spring 18 having one end 19 tangentially extended to contact with the face 20 of the casing and thus to limit the rotative movement of the spring. The other end of the spring is bent to project substantially parallel to the axis of the spring, said end 21 extending downward through the arcuate slot 22 formed in the ear 11. Said end 21 is so disposed as to fit into the notch 23 formed in one side of the finger piece lever and thus bears against the lever, inward forcing of the handle portion 17 of the finger piece lever causing the end 21 to move outward in the slot 22 and tighten the spring 18, while upon releasing of the handle the spring will uncoil to force the nose grip forward into operative position.

From the foregoing description taken in connection with the accompanying drawings the construction of my improved finger piece attachment for eyeglasses will be readily apparent, and it will be seen that I have provided a simple and efficient attachment which may be secured either to ordinary nose glasses when the same are being manufactured or which may be employed as an attachment for spectacles or other types of glasses not originally having finger piece nose grips and which is retained in position by a single screw and may consequently be quickly and easily applied or detached.

The desirability of such a device will be apparent to all familiar with the eyeglass art, since it will be seen that my attachment in no wise mars the appearance of the glasses and requires merely the drilling of a single hole for the screw 9 to apply the attachment, which hole will be practically unnoticeable should the attachment be afterward removed and thus will not materially mar or damage the glasses.

It will further be observed that on account of the construction of the housing or casing and the fitting of the ends of the ears against the bridge 5 said casing in conjunction with the bridge serves to inclose and conceal the actuating spring 18 while permitting of the ready removal and replacement of the spring when necessary by simply removing the pivot screw.

I claim:

1. A unitary finger piece attachment, comprising a casing, means for securing the casing to a lens mounting, a finger piece pivoted to the casing, and means in the casing for actuating the finger piece.

2. A unitary finger piece attachment, comprising a casing, means for securing the casing to a lens mounting, a finger piece pivoted to the casing and means carried by the casing for actuating the finger piece.

3. A unitary finger piece attachment, comprising a casing, means for securing the casing to a lens mounting, a finger piece pivoted to the casing and means inclosed by the casing for shifting the finger piece.

4. The combination with a lens mounting, of a casing secured thereto, a finger piece pivoted to the casing, and means for automatically operating the finger piece.

5. The combination with a lens mounting, of a casing fitting thereagainst, means for securing the casing to the mounting, and a finger piece resiliently supported by the casing.

6. The combination with a lens mounting, of a casing removably secured thereto, a spring mounted in the casing and having an end projecting therefrom, and a finger piece pivoted to the casing and engaged by said end, whereby the spring holds the finger piece in operative position.

7. The combination with a bridge having lens engaging clips on its ends, of a casing having ears spanning the bridge, and a finger piece resiliently supported by the casing.

8. The combination with a bridge having lens engaging clips, of a casing having ears spanning and engaging the bridge, and means for securing the casing in position.

9. The combination with a bridge, of a finger piece support having ears spanning and tightly engaging the bridge.

10. The combination with a bridge, of a finger piece support having ears spanning and engaging the bridge, means for securing the support in position, and a finger piece resiliently mounted on the support.

11. The combination with a lens engaging clip, of a casing detachably secured thereto, a bridge projecting from the clip and engaging and supporting the casing, and a finger piece carried by the casing.

12. The combination with a bridge, having lens clips on its ends, of casings secured to the lens clips and having portions engaging the bridge adjacent the clips, a finger piece pivoted to each casing, and a spring within the casing having a projecting portion engaging the finger piece.

13. A unitary finger piece attachment, comprising a casing having an arcuate slot formed in one side thereof, a spring mounted in the casing and having one end bearing against the casing and the other projecting through the slot, and a finger piece pivoted to the casing and engaged by the projecting end of the spring.

14. The combination with a bridge, of a partially open casing so engaging the bridge that the latter forms a partial closure for the opening of the casing, a lever pivoted to one of said parts, and an actuating spring for the lever mounted in the casing and concealed by the casing and bridge.

In testimony whereof I affix my signature in presence of two witnesses.

GEORGE H. DAY.

Witnesses:
ROBERT S. CALLENDER,
REGINALD H. WATERS.